United States Patent [19]

Asbery

[11] Patent Number: 5,123,315
[45] Date of Patent: Jun. 23, 1992

[54] APPARATUS AND METHOD FOR STARTING CUTTING WIRE

[75] Inventor: Ray Asbery, Round Rock, Tex.

[73] Assignee: Equalizer Industries, Inc., Round Rock, Tex.

[21] Appl. No.: 605,234

[22] Filed: Oct. 29, 1990

[51] Int. Cl.$^5$ .............................................. B25B 33/00
[52] U.S. Cl. ............................................. 83/13; 30/358; 30/366
[58] Field of Search ................. 83/13; 30/358, 366; 29/242; 408/204, 230

[56] References Cited

U.S. PATENT DOCUMENTS

| | | | |
|---|---|---|---|
| 743,335 | 11/1903 | Rogers | 30/366 |
| 2,087,186 | 7/1937 | Freeman, Jr. | 30/358 |
| 2,219,605 | 10/1940 | Turkel | 408/204 |
| 2,424,474 | 7/1947 | MacGregor | 30/358 |

*Primary Examiner*—Hien H. Phan
*Attorney, Agent, or Firm*—Shaffer & Culbertson

[57] ABSTRACT

A device for starting a cutting wire through a material to be cut by the wire includes an elongated starter tube having an opening extending through its entire length. An insertion facilitating arrangement is formed at an insertion end of the elongated starter tube and a force receiving surface is positioned at the end of the starter tube opposite the insertion end. A handle is preferably connected to the starter tube at the end opposite the insertion end and the force receiving surface is preferably formed on the handle. By applying a sufficient force to the force receiving surface the insertion end of the elongated starter tube may pierce the material to be cut and be driven completely through the material to the opposite side. Once the starter tube traverses the material to be cut, one end of the thin and flexible cutting wire may be inserted through the tube opening until it too traverses the material to be cut. Then, while holding the cutting wire in its posiiton traversing the material, the starter tube may be withdrawn from the material leaving the cutting wire started and in position to be connected to suitable handles for manipulating the wire to cut the material.

8 Claims, 2 Drawing Sheets

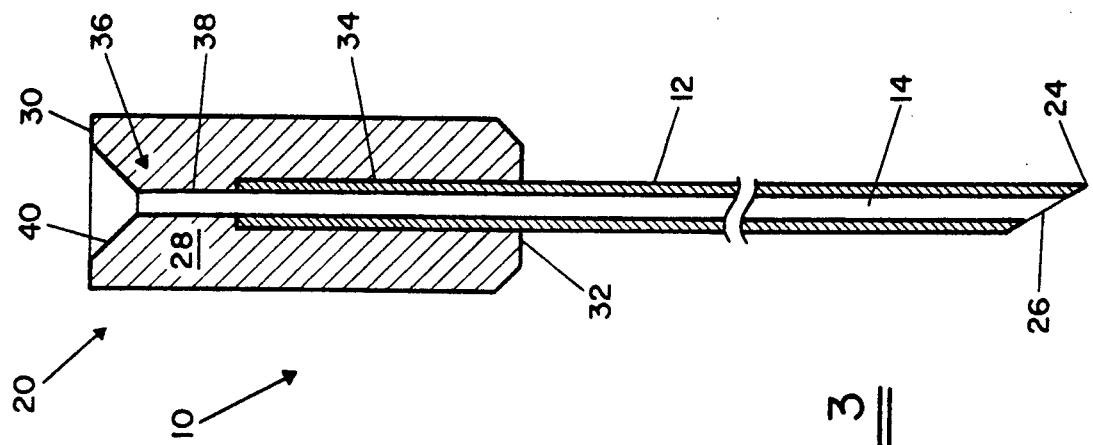
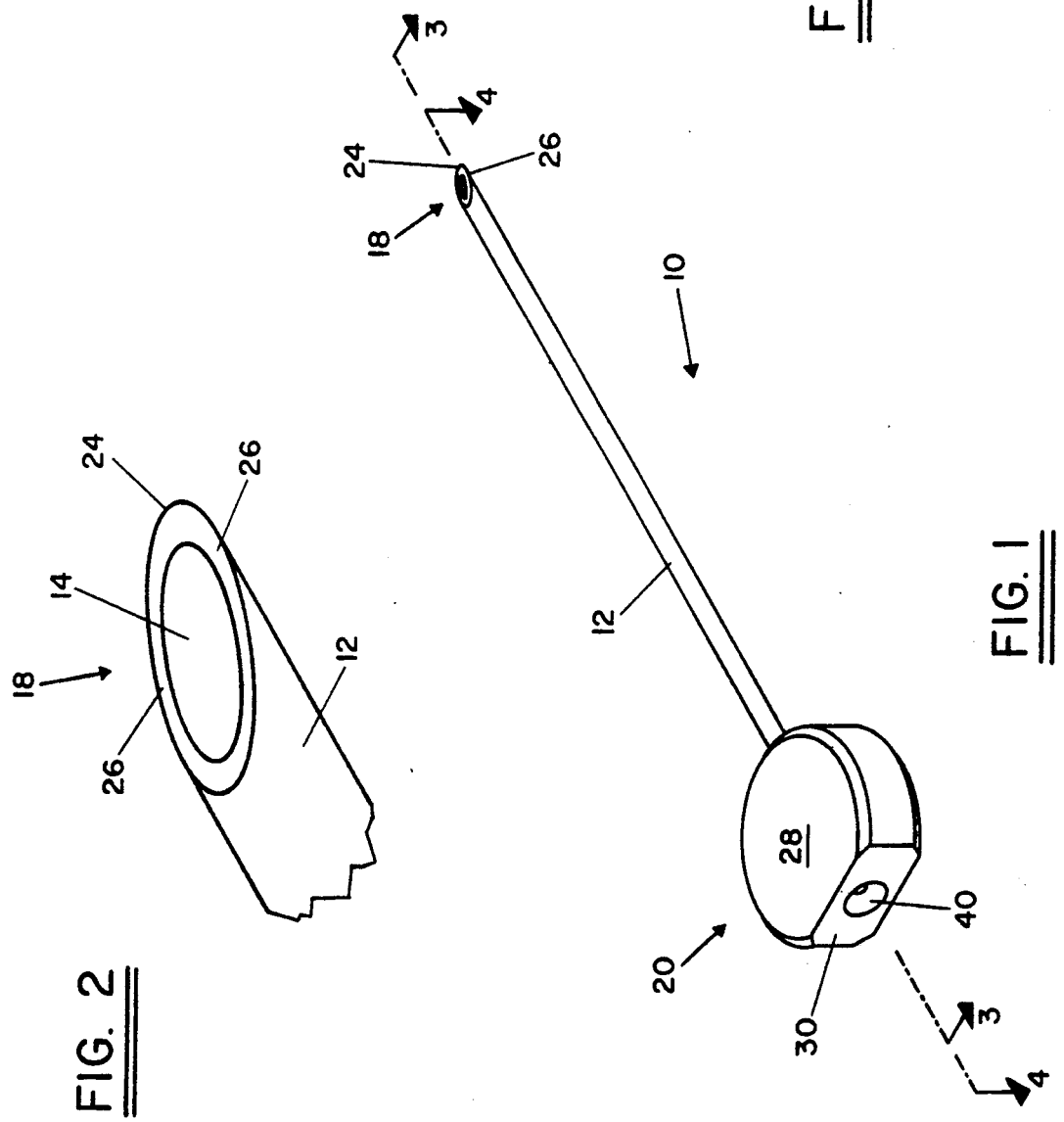

APPARATUS AND METHOD FOR STARTING CUTTING WIRE

BACKGROUND OF THE INVENTION

This invention relates to the use of a cutting wire, and particularly, to an apparatus and method for starting a cutting wire through a material to be cut with the wire.

Wire saws have been used to cut many types of materials. A wire saw consists of a length of suitable thin cutting wire and handles which may be connected at either end of the wire. In operation, the cutting wire is positioned so as to traverse the object or material to be cut and then the wire is reciprocated back and forth against the material using the handles to hold the wire. This reciprocating motion of the thin wire against the material cuts through the material.

Although wire saws are inexpensive to manufacture and are effective for many applications, they are not well suited for cutting a material that has no accessible edge. In order to cut a material having no accessible edge with a cutting wire, one end of the wire must be started or inserted through the material so that the handles may be attached and the desired reciprocating motion imparted. Starting or inserting the thin and flexible cutting wire through the material to be cut may be difficult or even impossible depending on the type of material.

For example, the sealant material with which a vehicle windshield is sealed within the windshield frame usually extends continuously around the entire perimeter of the glass and, therefore, has no accessible edge. In order to cut the windshield sealant material with a cutting wire, the cutting wire first had to be started through the material and then the handles connected on either side of the glass so that the wire could be reciprocated to provide the desired cutting action. However, it was very difficult and time consuming to insert one end of the wire through the tough and resilient sealant material. In some cases it was simply not possible to start the wire. In these cases either the glass had to be broken to provide an accessible edge to the sealant material or a hole had to be drilled through the material through which the cutting wire could be inserted. Both situations were unsatisfactory, the former because it was often desirable to save the glass intact and the latter because it was difficult to drill a suitable starting hole due to the limited work space around the windshield.

SUMMARY OF THE INVENTION

It is a general object of the invention to provide a cutting wire starting apparatus and method that overcomes the abovementioned problems and others associated with starting a cutting wire through a material to be cut with the wire.

Pursuant to this object a cutting wire starting apparatus includes an elongated starter tube having an insertion end which may be inserted through a material to be cut with the cutting wire. The starter tube insertion end is inserted by placing the insertion end against the material and then applying an insertion force at a force receiving surface connected to the tube. The starter tube has a tube opening extending its entire length which is large enough in diameter to allow the cutting wire to easily pass therethrough. Once the insertion end of the starter tube is inserted through the material to be cut, the cutting wire may be inserted through the tube opening until it traverses the material. The starter tube may then be withdrawn from the material leaving the wire traversing the material in position to be connected to suitable handles by which the wire may be reciprocated.

The apparatus according to the invention also includes insertion facilitating means at the insertion end of the starter tube for enabling the insertion end of the tube to be easily inserted through the material to be cut. The preferred insertion facilitating means includes a sharpened piercing edge along one side of the tube and blunt edges on adjacent sides of the tube. The piercing edge easily pierces the material to be cut and the adjacent blunt edges then tend to separate the material as the tube in inserted further rather than cutting the material and leaving a core of material in the tube opening which would block the opening and prevent insertion of the wire. The preferred piercing edge and adjacent blunt edge arrangement is formed by cutting the tube transversely at an acute angle to form a wedge shape terminating at the piercing edge.

The preferred form of the invention also includes a handle connected to the end of the starter tube opposite its insertion end. The force receiving surface preferably forms an upper surface of the handle so that the starter tube may be inserted conveniently by hand. The handle also includes a lower surface extending on either side of the tube to provide a convenient means by which the tube may be withdrawn from an inserted position in the material to be cut with the wire. The handle is preferably fixed to the end of the tube by suitable means with a connecting opening formed in the handle providing access to the tube opening. The connecting opening may have an enlarged portion which gradually narrows down to form a frustoconical shape through which the cutting wire end may easily be inserted into the relatively narrow tube opening.

These and other objects, advantages, and features of the invention will be apparent from the following description of the preferred embodiments, considered along with the accompanying drawings.

BRIEF DESCRIPTION OF THE DRAWINGS

FIG. 1 is a view in perspective of a cutting wire starting apparatus embodying the principles of the invention.

FIG. 2 is an enlarged view in perspective of the insertion end of the starter tube.

FIG. 3 is view in longitudinal section taken along line 3—3 in FIG. 1.

DESCRIPTION OF THE PREFERRED EMBODIMENTS

Figure 4:
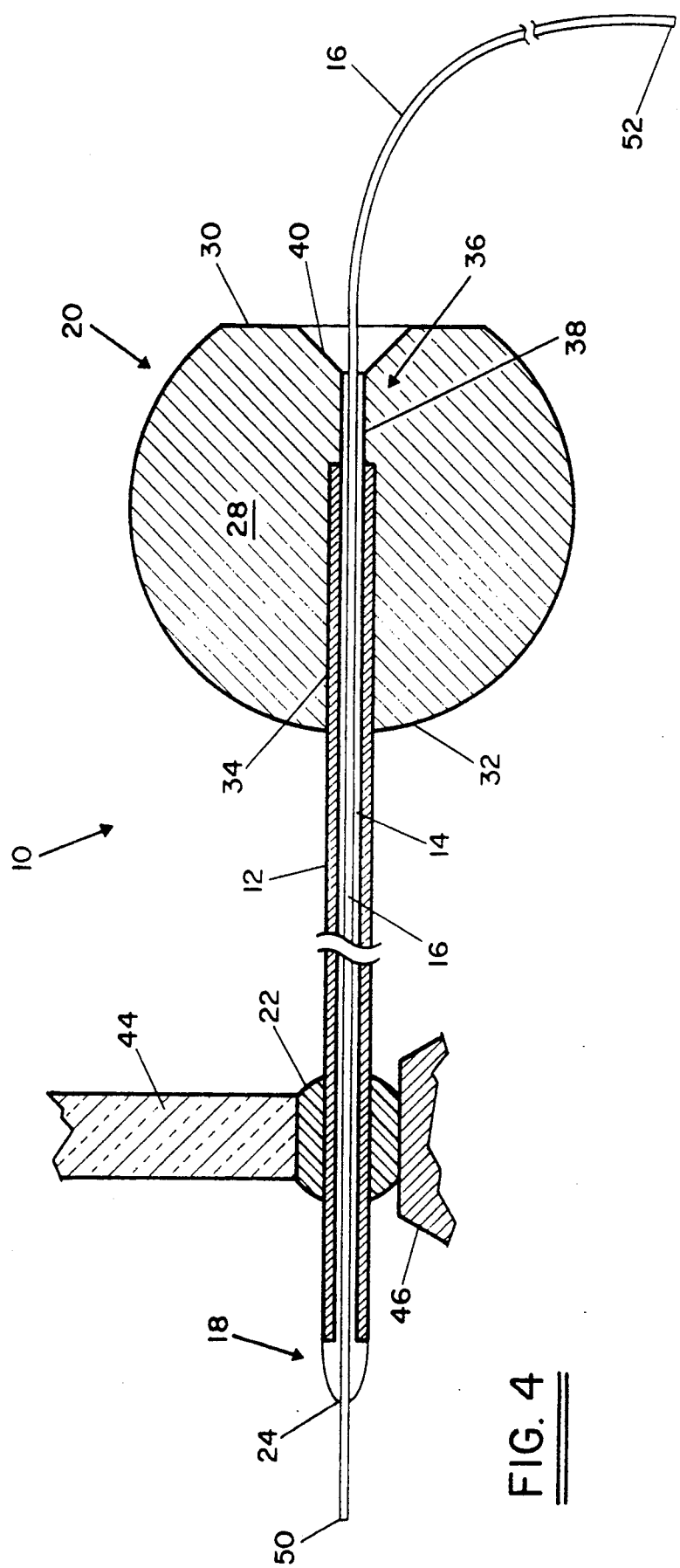
FIG. 4 is a view in longitudinal section taken along line 4—4 in FIG. 1 and showing the starter tube inserted through a material to be cut and with a cutting wire inserted through the starter tube so as to traverse the material to be cut.

FIGS. 1-4 show a cutting wire starting device 10 embodying the principles the invention. The device 10 includes an elongated starter tube 12 with a tube opening 14 extending its entire length. The tube opening 14 is large enough in diameter to allow a cutting wire 16 (shown in FIG. 4) to pass therethrough. In the illustrated preferred form of the invention, the tube 12 is generally cylindrical in shape as is the tube opening 14. The illustrated tube 12 also includes an insertion end 18 and a handle 20 at the opposite end thereof.

The device 10 includes insertion facilitating means formed at the insertion end 18 of the tube for enabling the insertion end to readily pierce and pass through the material to be cut 22 (shown in FIG. 3) on applying an insertion force to the device. As shown best in FIGS. 1, 2, and 3 the preferred insertion facilitating means includes a leading or piercing edge 24 on one side of the tube 12 and adjacent blunt portions 26 tapering away from the piercing edge to the opposite side of the tube. This preferred insertion facilitating arrangement may be formed easily by cutting the tubing from which the starter tube 12 is formed along a plane at an acute angle to a plane transverse to the tubing.

The handle 20 at the end opposite the insertion end 18 of the starter tube 12 includes a handle body 28 with an upper or first surface 30 and a lower or second surface 32. The upper surface 30 of the handle 20 forms a force receiving surface of the device by which the insertion force may be readily applied to push the insertion end 18 of the tube through the material to be cut 22. A starter tube receiving opening 34 extends into the handle body 28 from the lower or second surface 32 thereof, and a connecting opening 36 extends from the end of the tube receiving opening to the first or upper surface 30. The tube receiving opening 34 is sized to tightly and securely receive the end of the starter tube 12 opposite to its insertion end 18 The connecting opening preferably has an inner portion 38 with an internal diameter similar to the internal diameter of the starter tube 12 and an enlarged frustoconical or funnel portion 40 with the base or larger end opening at the upper or first handle surface 30. The size difference between the tube receiving opening 34 and the adjacent inner portion 38 of the connecting opening 36 forms a shoulder of material that forms a stop against which the end of the tube opposite the insertion end rests.

The method of starting the cutting wire 16 according to the invention may be described with particular reference to FIG. 4. In FIG. 4, the material to be cut 22 is a windshield sealant material applied between a windshield 44 and the frame 46 in which the windshield is set. The method includes first inserting the insertion end 18 of the starter tube 12 through the material to be cut 22. The insertion force required for pushing the tube 12 through the material is conveniently applied at the force receiving surface associated with the tube, in this case the upper surface 30 of the handle body 28. The insertion facilitating means allows the insertion end 18 of the tube 12 to pass more easily through the material 22 and reduces the amount of insertion force required. With the illustrated preferred insertion facilitating means, the piercing edge 24 first pierces the material to be cut 22 as the insertion force is applied and the adjacent blunt portions 26 tend to separate the pierced material to enable the tube to pass. This piercing and then separating action helps prevent a core of the material to be cut from being formed in the tube which could block the passage of the cutting wire.

Once the starter tube 12 is inserted so that it completely traverses the material to be cut 22, the method of the invention continues with the step of inserting a first end 50 of the cutting wire 16 through the starter tube opening 14 until the cutting wire completely traverses the material to be cut and preferably until the cutting wire actually extends a good length out of the insertion end of the starter tube. In the form of the invention adapted particularly for starting the cutting wire 16 through the sealant material 22 around a vehicle windshield, the starter tube 12 is formed from a suitable rigid material such as stainless steel and has an outer diameter of approximately 0.083 inches and an inner diameter of approximately 0.063 inches. This internal diameter size allows a standard sealant cutting wire having an outer diameter of approximately 0.020 inches to pass through the tube with little resistance. The connecting opening 36 in the handle body 28 adjacent to the end of the starter tube 12 preferably also has a diameter of approximately 0.063 inches and the enlarged portion of the connecting opening with its frustoconical or funnel shape helps guide the thin and flexible cutting wire 16 into the narrow connecting opening inner portion 38 and the tube opening 14.

After both the tube 12 and cutting wire 16 are inserted (as shown in FIG. 4), the method continues with the step of withdrawing the insertion end 18 of the starter tube from the material to be cut 22 while holding the cutting wire in its position traversing the material. This leaves the first end 50 of the wire extending through to the opposite side of the material to be cut without having to push the thin flexible wire through the material itself or without having to connect the wire to a needle device for inserting the wire. Where the cutting wire 16 is relatively short and both ends are to be connected to a suitable handle (not shown) for manipulating the wire, the method also includes the step of pulling the starter tube over the second end 52 of the wire to leave the wire in position to be connected to the handles.

The above described preferred embodiments are intended to illustrate the principles of the invention, but not to limit the scope of the invention. Various other embodiments and modifications to these preferred embodiments may be made by those skilled in the art without departing from the scope of the following claims.

I claim:

1. A method for starting a cutting wire through a material to be cut with the wire, the method comprising the steps of:
   (a) inserting an insertion end of an elongated starter tube through the material to be cut, the starter tube having an opening extending through the entire length of the starter tube and through which the cutting wire may pass;
   (b) inserting a first end of the cutting wire through the opening in the starter tube at least until the cutting wire completely transverses the material to be cut; the
   (c) withdrawing the insertion end of the starter tube from the material to be cut while maintaining the position of the cutting wire traversing the material to be cut.

2. The method of claim 1 including the step of:
   (a) pulling the starter tube over a second end of the cutting wire to remove the starter tube from the wire after withdrawing the insertion end of the starter tube from the material to be cut.

3. The method of claim 1 wherein the step of inserting the end of the starting tube through the material to be cut includes:
   (a) piercing the material to be cut with a piercing end portion of the starting tube to form a pierced opening in the material; and
   (b) separating the edges of the pierced opening in the material to be cut, the separating step being performed with a separating portion of the starting tube insertion end to prevent the material to be cut from substantially entering the opening at the insertion end of the starter tube.

4. A device for starting a cutting wire through a vehicle glass sealant material to be cut with the wire, the material being positioned between the glass and frame in which it is set, the device comprising:
  (a) an elongated starter tube having a length sufficient to transverse the material to be cut and having a tube opening through which the cutting wire may pass, the tube opening extending the entire length of the starter tube, and the starter tube having a substantially constant outer cross-sectional shape along its entire length to help facilitate inserting the starter tube through the material to be cut;
  (b) a piercing edge formed along a portion of the starter tube circumference at an insertion end of the starter tube;
  (c) a blunt portion formed at the insertion end of the starter tube and extending between the outer circumference of the starter tube and the tube opening for preventing the material to be cut forming an acute angle with a plane extending transversely with respect to the starter tube so that the piercing edge forms a leading edge of the insertion end of the starter tube; and
  (d) an insertion force receiving surface positioned substantially at the end of the elongated starter tube opposite the insertion end and through which an insertion force may be applied to the starter tube to pierce the material to be cut with the piercing edge and advance the insertion end of the starter tube completely through the material.

5. The device of claim 4 further comprising:
  (a) a handle connected to the starter tube at the end opposite the insertion end of the tube.

6. The device of claim 5 wherein the insertion force receiving surface comprises an upper surface of the handle.

7. The device of claim 6 wherein the handle includes:
  (a) a pulling surface extending generally transversely with respect to the starter tube from generally opposite points on the circumference thereof.

8. The device of claim 5 wherein the handle includes:
  (a) a handle body;
  (b) a starter tube receiving opening extending into the handle body from a lower surface thereof, the starter tube receiving opening adapted to receive the end of the starter tube opposite the insertion end;
  (c) a connecting opening through which he cutting wire may pass extending through the handle body from the starter tube receiving opening to a surface of the handle, the connecting opening having a first nd aligned with the end of the starter tube receiving opening within the handle body;
  (d) a frustoconical starter portion of the connecting opening with its larger diameter end terminating at the surface of the handle to which the connecting opening extends; and
  (e) stop means within the handle body for preventing the starter tube from passing through the connecting opening from the first end thereof.

* * * * *

UNITED STATES PATENT AND TRADEMARK OFFICE
CERTIFICATE OF CORRECTION

PATENT NO. : 5,123,315
DATED : June 23, 1992
INVENTOR(S) : Ray Asbery It is certified that error appears in the above-identified patent and that said Letters Patent is hereby corrected as shown below:

In Column 4, Line 49, change "the" to --and--.

In Column 6, Line 24, change "nd" to --end--.

In Column 5, Line 23, insert after "cut" --from substantially entering the tube opening as the insertion end of the starter tube is inserted through the material to be cut, the blunt portion--.

Signed and Sealed this

Fifteenth Day of June, 1993

*Attest:*

MICHAEL K. KIRK

*Attesting Officer*    *Acting Commissioner of Patents and Trademarks*